(12) United States Patent
Fontana et al.

(10) Patent No.: US 6,170,081 B1
(45) Date of Patent: Jan. 2, 2001

(54) METHOD AND SYSTEM FOR INTERFACING TO A VARIETY OF SOFTWARE DEVELOPMENT TOOLS

(75) Inventors: James Albert Fontana; Anthony Reginald Pitchford, both of Mission Viejo; Christopher Eyre Smith, Coto de Caza; Mark Jeffrey Tadman, Mission Viejo, all of CA (US)

(73) Assignee: Unisys Coporation, Blue Bell, PA (US)

( * ) Notice: Under 35 U.S.C. 154(b), the term of this patent shall be extended for 0 days.

(21) Appl. No.: 09/156,029

(22) Filed: Sep. 17, 1998

(51) Int. Cl.[7] .................................................. G06F 9/445
(52) U.S. Cl. ................................. 717/1; 717/10; 707/10; 707/103 Z; 707/513; 709/213; 709/246; 709/332
(58) Field of Search .................. 717/1, 5, 10; 707/10, 707/104, 103, 513, 103 R, 103 Y, 103 Z; 709/316, 329, 203, 213, 201, 246, 332; 703/22

(56) References Cited

U.S. PATENT DOCUMENTS

| | | | |
|---|---|---|---|
| 5,721,925 | * 2/1998 | Cheng et al. ......................... | 709/303 |
| 5,848,273 | * 12/1998 | Fontana et al. ......................... | 717/1 |
| 5,854,932 | * 12/1998 | Mariani et al. ......................... | 717/9 |
| 5,881,268 | * 3/1999 | McDonald et al. ..................... | 703/21 |
| 5,889,992 | * 3/1999 | Koerber ................................. | 717/2 |
| 5,940,075 | * 8/1999 | Mutschler, III et al. ............. | 345/335 |
| 5,974,430 | * 10/1999 | Mutschler, III et al. ............. | 707/505 |
| 5,978,579 | * 11/1999 | Buxton et al. ......................... | 717/1 |
| 6,016,394 | * 1/2000 | Walker ................................... | 717/1 |
| 6,018,627 | * 1/2000 | Iyengar et al. ......................... | 717/1 |
| 6,038,393 | * 3/2000 | Iyengar et al. ......................... | 717/1 |

OTHER PUBLICATIONS

M2 Presswire, "IBM: New standard will make Web–based programming more consistent", Jun. 12, 1998, 3 pages.*

* cited by examiner

Primary Examiner—Tariq R. Hafiz
Assistant Examiner—Tuan Q. Dam
(74) Attorney, Agent, or Firm—J. Ronald Richebourg; Mark T. Starr; Rocco L. Adornato

(57) ABSTRACT

A method and system for facilitating use of a tool in heterogeneous environments and application categories in a software development framework having a storage device. First, a context object is created for storing all intermediate information generated while the tool is being used. Next, the specific environment in which the tool is going to be used is identified information about the environment is stored in the context object. The specific tasks the tool typically performs are identified and searched for any previously accomplished tasks in the framework. The results of the search are stored in the context object. Information needed for the tool to operate is retrieved from the repository and the information is supplied as input files to the tool. The tool is run with the input files and the output derived is stored as a result of running the tool. The context object is updated by analyzing the output derived from the tool. Then, the analyzed output of the operation performed by the tool is stored in the repository for the environment.

14 Claims, 5 Drawing Sheets

METHOD AND SYSTEM FOR INTERFACING TO A VARIETY OF SOFTWARE DEVELOPMENT TOOLS

A portion of the disclosure of this patent document contains material that is subject to copyright protection. The copyright owner has no objection to the facsimile reproduction by anyone of the patent disclosure, as it appears in the Patent and Trademark Office patent files or records, but otherwise reserves all copyright rights whatsoever.

A microfiche Appendix illustrating the code for one embodiment of the present invention (comprising fourteen frames) is included in the U.S. Patent Office files relating to this invention.

CROSS REFERENCE TO RELATED APPLICATIONS

This patent document relates to the following co-pending applications, assigned to the same assignee hereof, which are incorporated herein by reference.

U.S. Ser. No. 09/154,613, entitled A METHOD AND SYSTEM FOR MONITORING AND CAPTURING ALL FILE USAGE OF A SOFTWARE TOOL;

U.S. Ser. No. 09/156,028, entitled A SOFTWARE SYSTEM DEVELOPMENT FRAMEWORK;

U.S. Ser. No. 09/156,027, entitled A METHOD AND SYSTEM FOR CONTROLLING AND TRACKING CLIENT ACCESS TO SERVER SOFTWARE; and, U.S. Ser. No. 09/156,026, entitled A METHOD AND SYSTEM FOR BUILDING COMPONENTS IN A FRAMEWORK USEFUL IN DEVELOPING INTEGRATED BUSINESS-CENTRIC APPLICATIONS.

FIELD OF THE INVENTION

The present invention generally relates to a method and system for integrating various software tools for a development framework, and more particularly to a method and system for surrounding and adapting a software development tool in order to generate different interfaces for such tool.

BACKGROUND OF THE INVENTION

Current technology does not adequately address the needs for adapting various software development tools for use in a single development process or the needs for rendering a software development tool in usable form in heterogeneous development processes. Although a tool can be used for a particular software development activity it is generally not adaptable for use in another software development activity in a heterogeneous development environment. Similarly, this lack of adaptability prevents the use of a multiplicity of tools for the same software development activity.

A further shortcoming of the current technology is that tools are usually inextricably linked to specific middleware, requiring a pairing of a specific tool with a specific middleware, when creating business applications. As an example of this shortcoming, if one tool is used to develop the business process model, one might be bound in the selection of the same tool to create the application source code for the model. The lack of tool independence is mainly due to the inability to exchange information between tools and interface the tool to that particular application.

The term "tool" as used herein shall mean anything that helps accomplish a process, such as a component development that assists in the development of software applications. The term "wrapper" as used herein shall mean software code that surrounds and adapts a component or asset and provides it with different interfaces. Hence, the term "tool wrapper" as used herein shall mean software code that surrounds and adapts a tool and assists in the development of software applications, which code provides a different interface than the tool had originally.

Another shortcoming of the prior art is the inability to add a tool to a framework (e.g., a program or a Web page) such that its usage pattern is transparent to the native system.

SUMMARY OF THE INVENTION

The present invention is a method and system that facilitates use of a software tool in heterogeneous environments and application categories in a software development framework, which has a storage device. First, a context object is created for storing all intermediate information generated while the tool is being used. Next, the specific environment in which the tool is going to be used is identified information about the environment is stored in the context object. The specific tasks the tool typically performs are identified and searched for any previously accomplished tasks in the framework. The results of the search are stored in the context object. Information needed for the tool to operate is retrieved from the repository and the information is supplied as input files to the tool. The tool is run with the input files and the output derived is stored as a result of running the tool. The context object is updated by analyzing the output derived from the tool. Then, the analyzed output of the operation performed by the tool is stored in the repository for the environment.

An object of the present invention is to provide a method and system that allows a user to develop business process applications with the use of heterogeneous tools.

Another object of the present invention is to provide a method and system that allows use of a software development tool in heterogeneous applications and environments.

Yet another object of the present invention is to provide a method and system that overcomes the prior art limitations of integrating only those tools from the same vendor, or the lack of functional scope for integrating newly developed tools, or the lack of tool interoperability.

Still another object of the present invention is the provision of a method and system that allows one to take existing software tools from a variety of vendors and to integrate them into a coherent development framework in lieu of developing new tools.

An advantage of interfacing tools using the method and system of the present invention is that a standard interface for a tool can be invoked by other components of the framework without their knowledge of which tool is actually being invoked.

A feature of the method and system of the present invention is that all tools under a particular category of application development or maintenance appear exactly the same to the framework.

Another feature of the method and system of the present invention is that a new tool may be added transparently to the framework.

Still other objects, features and advantages of the present invention will become readily apparent to those skilled in the art from the following detailed description, wherein is shown and described only the preferred embodiment of the invention, simply by way of illustration of the best mode contemplated of carrying out the invention. As will be realized, the invention is capable of other and different embodiments, and its several details are capable of modifications in various obvious respects, all without departing from the invention. Accordingly, the drawings and description are to be regarded as illustrative in nature, and not as restrictive, and what is intended to be protected by Letters Patent is set forth in the appended claims. The present invention will become apparent when taken in conjunction with the following description and attached drawings, wherein like characters indicate like parts, and which drawings form a part of this application.

DETAILED DESCRIPTION OF ONE EMBODIMENT

Before proceeding with a description of the system and method of the present invention, a summary of Terminology used herein is provided, which may be helpful in understanding the disclosed embodiment.

An object is an abstract representation of a real-world concept or thing. For example, an object can be used to represent a customer account in a banking application. An object has features, which can be either an operation or a property. An operation defines an action that an object can perform, or an action that can be performed on the object. For example, "make withdrawal" could be defined as an operation on a customer account object. Properties indicate the state of an object. Every property of an object has a value, and it is the property values that define the state of the object. A property can be either an attribute or a reference. An attribute defines a value that is stored within the object. For example, "current account balance" could be an attribute of the customer account object. The numeric value for the customer's account balance would be stored in the customer account object. A reference is a link or pointer to another object, and implies a relationship to that other object. A reference is typically used when it is desired not to duplicate data. For example, the customer account object could store the customer's name and address as attributes. However, if the customer opened multiple accounts, the customer's name and address would appear in multiple account objects. Therefore, it is desirable to define a separate customer object and place the name and address as attributes of the customer object. The customer account object would then contain a reference to the customer object.

A normal object program stores objects in a computer system's memory. When the program terminates, the memory used by those objects is freed and reused by other programs, making the objects that the program stored transient. An object database stores objects in a non-volatile memory, such as a computer disk. Since the information on a computer disk remains in existence, even when the computer is turned off, an object database provides the ability to persistently store objects. An object program that uses an object database thus has the option of storing objects transiently or persistently.

The term protocol as used herein refers to a set of formal rules describing how to transmit data, especially across a network. Low-level protocols define the electrical and physical standards to be observed, bit- and byte-ordering and the transmission and error detection as well as correction of the bit stream. High-level protocols deal with message formatting, including the syntax of messages, the terminal to computer dialogue, character sets, sequencing of messages, etc.

The term schema as used herein refers to the logical description of data in a database, including definitions and relationships of data.

Figure 1:
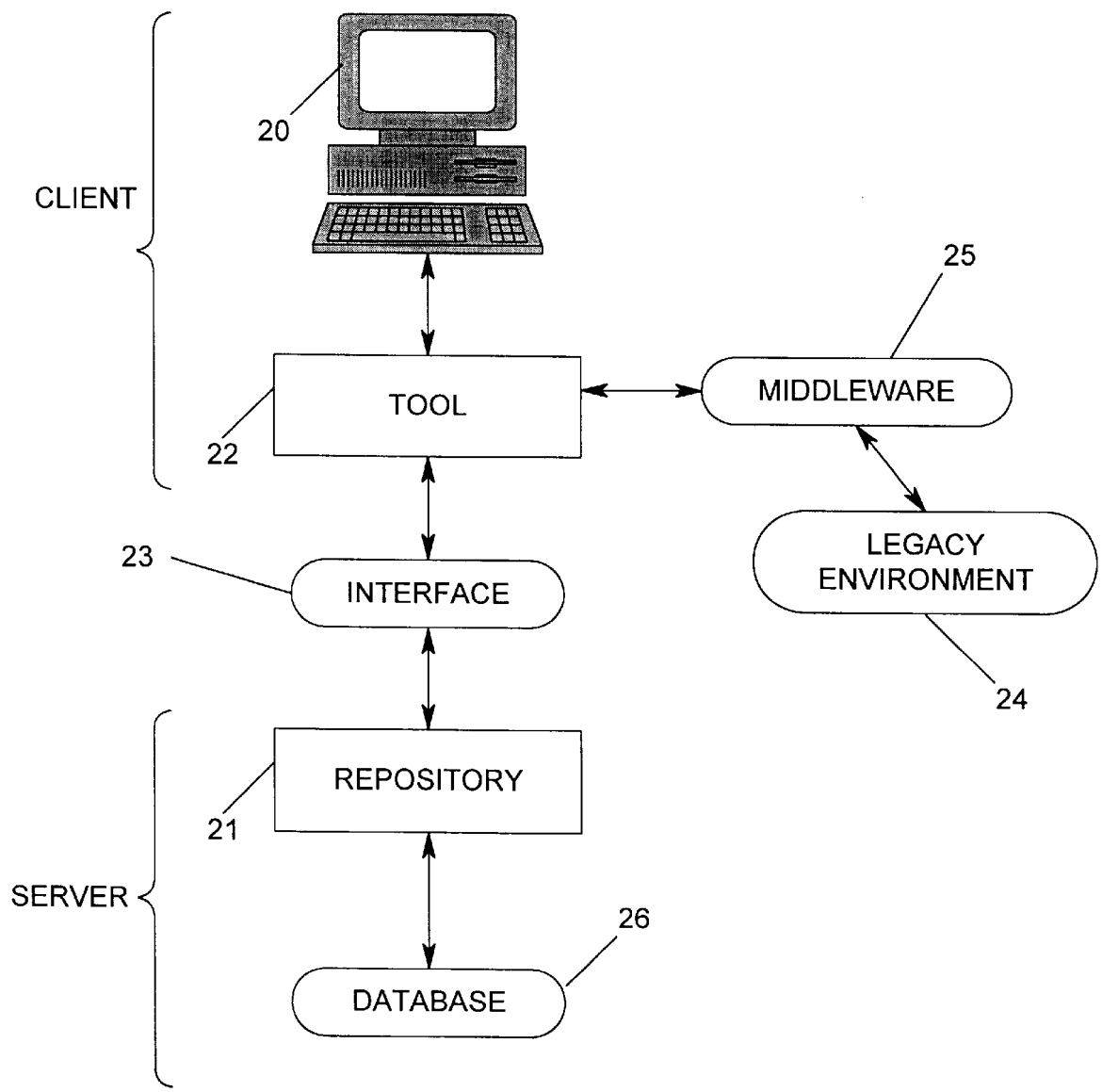
FIG. 1 is a block diagram of a prior art development system and method.

Referring now to the drawings and FIG. 1 in particular, a block diagram of a system is shown of the prior art technique for execution of legacy programs in a server environment. In the disclosed embodiment, the server environment is Windows NT, which is a proprietary operating system of Microsoft Corporation of Redmond, Wash. A user platform 20 (typically a PC with a large memory and processing power) is coupled to a repository 21 by means of a software tool 22 and to an interface 23. The tool 22 may have access to a legacy environment 24 by means of middleware 25, and the repository 21 may have access to a database 26.

The developer using the tool 22 examines the description of the legacy environment 24, which is stored in the repository 21. Using the information obtained, the developer encodes into tool 22 a set of calls to middleware 25, which facilitate the required communication with the legacy environment 24. At development time, the tool 22 may contact the legacy environment 24 via the middleware 25 without reference to the information stored in the repository 21. The interface 23 converts the communication protocol of the tool 22 to one recognizable by the repository 21, and vice versa.

A problem with the prior art method and system is that each tool requires its own interface, i.e., an interface unique to that tool. As will be amplified hereinbelow, the method and system of the present invention generates an interface for a category of tools, or a set of tools performing the same function.

Figure 2:
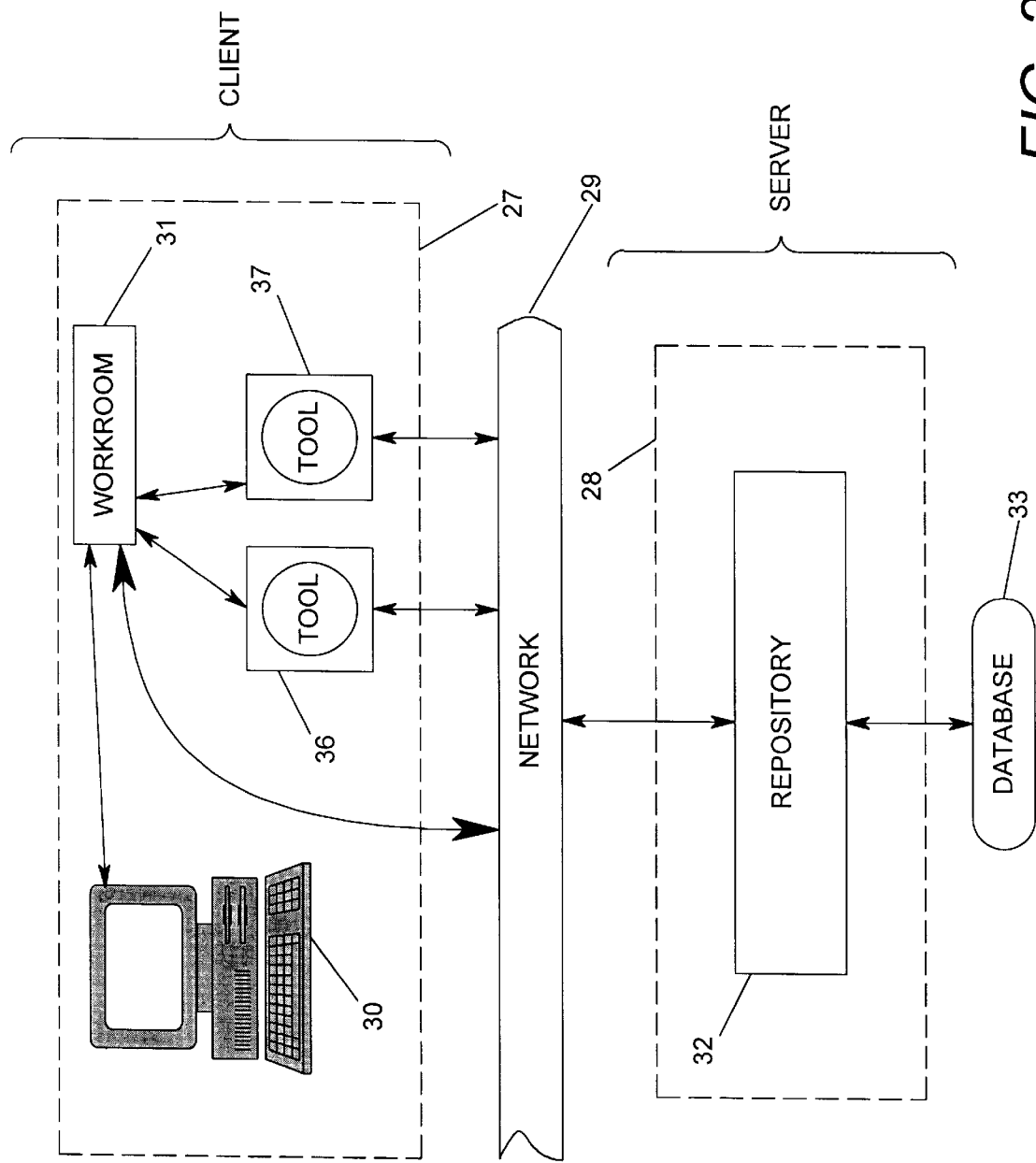
FIG. 2 is a block diagram of a system that uses the method and system of the present invention.

Referring now to FIG. 2, the system of the present invention is illustrated in block diagram form. For ease of understanding, the system is illustrated in two parts. First, there is a client 27 and a server 28 that communicate with one another over a network 29. The network 29 may comprise any conventional network (e.g., TCP/IP), or the Internet. It is noted that the client and server portions of the software may be executed on a single system, thereby obviating the need for the network 29.

A user platform 30, which may be the same or different from the user platform 20 depicted in FIG. 1, is coupled to a workroom 31 and both are shown as being part of the client 27. The workroom 31 is a front end component of the method and system of the present invention and is coupled to the network 29, which is coupled to a repository 32.

The repository 32 is a specialized, extensible object-oriented database application that adds value to a database system, which allows customization of a particular domain (such as application development) and it may be the same as the repository 21 depicted in FIG. 1. The repository 32 is coupled to a database 33 for accessing modeling data stored therein.

The repository 32 further includes methods for cataloging, browsing, modeling, and managing components that make up an application. Methods to support these services are disclosed in several patents and patent applications assigned to the assignee of this patent application, including U.S. Pat. No. 5,671,398 for METHOD FOR COLLAPSING A VERSION TREE WHICH DEPICTS A HISTORY OF SYSTEM DATA AND PROCESSES FOR AN ENTERPRISE; U.S. Pat. No. 5,644,764 for METHOD FOR SUPPORTING OBJECT MODELING IN A REPOSITORY; U.S. Pat. No. 5,581,755 for METHOD FOR MAINTAINING A HISTORY OF SYSTEM DATA AND PROCESSES FOR AN ENTERPRISE; U.S. Pat. No. 5,557,793 for IN AN OBJECT ORIENTED REPOSITORY, A METHOD FOR TREATING A GROUP OF OBJECTS AS A SINGLE OBJECT DURING EXECUTION OF AN OPERATION; pending application Ser. No. 08/623,490, filed on Mar. 28, 1996 now U.S. Pat. No. 5,889,997, for A METHOD FOR MAPPING TYPES IN A MODEL IN A OBJECT-ORIENTED REPOSITORY TO LANGUAGE CONSTRUCTS FOR A C BINDING FOR THE REPOSITORY; U.S. Pat. No. 5,721,925, for METHOD FOR GENERICALLY INVOKING OPERATIONS IN AN OBJECT ORIENTED REPOSITORY; pending application Ser. No. 08/549,352, filed on Oct. 27, 1995, for A METHOD FOR GENERATING OLE AUTOMATION AND IDL INTERFACES FROM METADATA INFORMATION; U.S. Pat. No. 5,765,039 for A METHOD FOR PROVIDING OBJECT DATABASE INDEPENDENCE IN A PROGRAM WRITTEN USING THE C++PROGRAMING LANGUAGE; U.S. Pat.No. 5,758,348, for A METHOD FOR GENERICALLY MANIPULATING PROPERTIES OF OBJECTS IN AN OBJECT ORIENTED REPOSITORY; U.S. Pat, No. 5,701,472, for A METHOD FOR LOCATING A VERSIONED OBJECT WITHIN A VERSION TREE DEPICTING A HISTORY OF SYSTEM DATA AND PROCESSES FOR AN ENTERPRISE; pending application Ser. No. 08/655,553, filed on May 30, 1996, for A METHOD FOR PACKING/UNPACKING C OPERATIONS TO/FROM RPC COMPATIBLE FORMAT USING THE RPC PROTOCOL TO OPERATE REMOTELY WITH AN OBJECT-ORIENTED REPOSITORY; pending application Ser. No. 08/934,833, filed on Sep. 22, 1997 now U.S. Pat. No. 6,038,629, for TOOL-INDEPENDENT APPLICATION DEVELOPMENT; and, pending application Ser. No. 08/934,834, filed on Sep. 22, 1997 now U.S. Pat. No. 6,038,393, for EXCHANGING INFORMATION BETWEEN DIFFERENT OBJECT MODELS AND UML; each of which are hereby incorporated by reference as if set forth in full herein.

Tools 36 and 37 (within the client 27) are disposed between the workroom 31 and the network 29 for performing a variety of tasks. For example, tool 36 may comprise a visual basic development tool, such as Visual Basic. Tool 36 is shown as being directly coupled to the network 29, which is linked to the repository 32. Tool 37 may comprise for example, Rational Rose98, which is available from Rational Software Corporation of Santa Clara, Calif.

One of the primary advantages of the present invention is the ability to allow the use of a tool's functionality whenever and wherever possible. The method and system disclosed and claimed herein are based upon a computer system framework that incorporates heterogeneous development environments and tools and integrates them.

Figure 3:
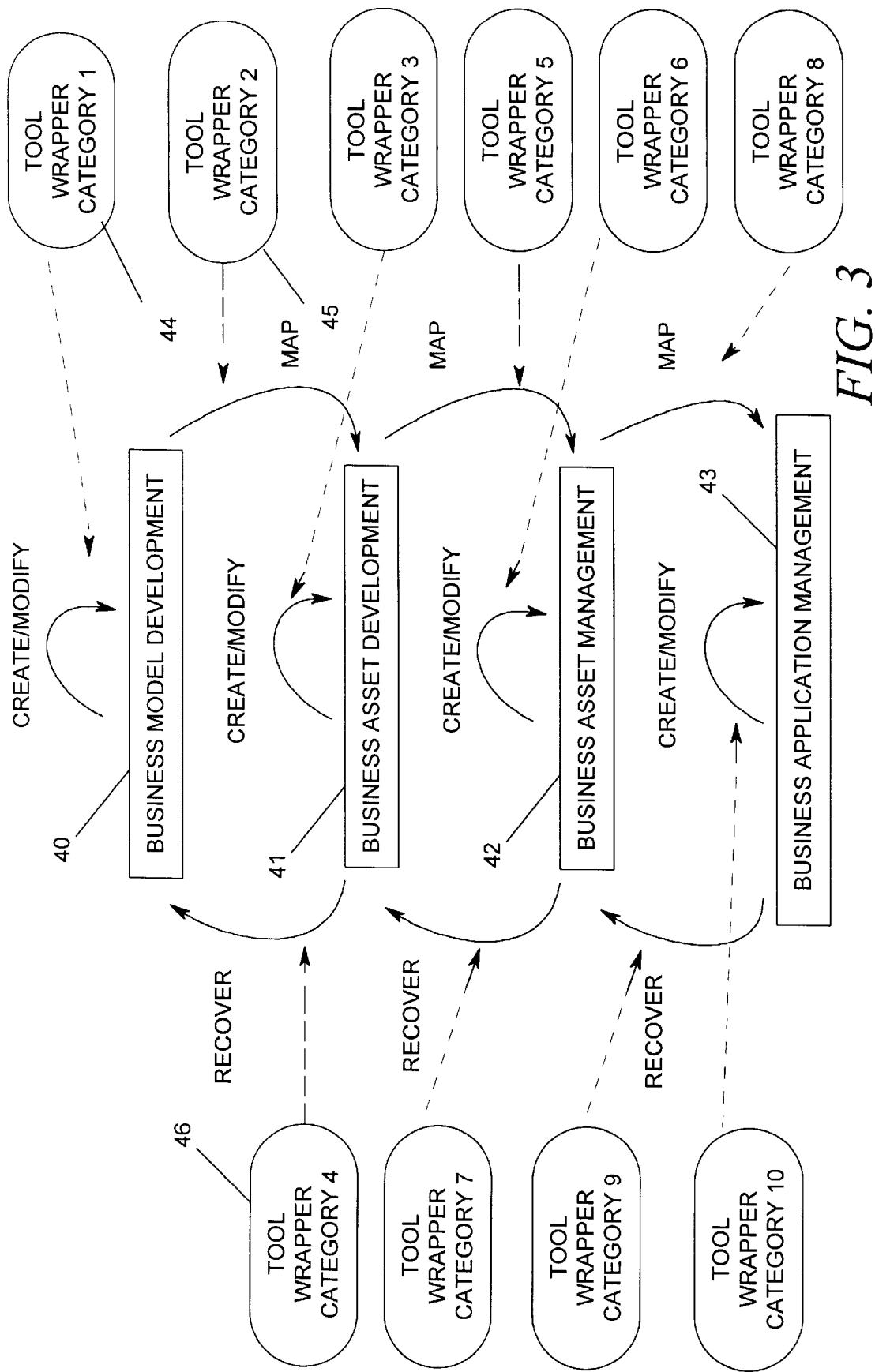
FIG. 3 is a conceptual diagram of a software development process illustrating use of the method and system of the present invention.

Referring now to FIG. 3, a conceptual diagram illustrates the typical stages involved in the lifecycle of an entire software development process. These typical stages of the development process for a business process software are depicted by four layers defined as follows: Business Model Development 40, Business Asset Development 41, Business Asset Management 42, and Business Application Management 43. To understand the scope of the term Business Model it is important to understand the term business domain. A business domain is defined as an entity in an organization that accomplishes specific tasks for proper working of the organization as a whole. Examples of business domains are sales department, human resource department, or the information technology department. A typical business domain generally comprises a wide range of functionalities, which in aggregation form the overall functions of a business domain. A clearly defined coherent description of such functionalities are called Business Models. They are the building blocks of an organization. Examples of Business Models can be the recruiting function of HR, the Intranet maintenance function of IT and the forecasting function of sales. A Business Model includes descriptions of people's roles, processes and procedures, and business rules. A Business Asset is defined as a particular aspect of a business, such as workflow, rules, components, transaction, database, people, strategy, laws, etc.

In a typical re-engineering and evolution process of a software development life cycle each layer creates or modifies its properties and objects and maps those properties and objects to the next lower layer, thereby tracing the hierarchy of the properties and objects to a lower level object. From the perspective of the lower level object the traceability identifies the source from which it inherits its properties. On the other hand, each layer recovers the constituent components of its objects and their relationships from the mapped or recovered object of its lower layer.

In particular, the Business Model Development layer 40 is mapped to the Business Asset Development layer 41. The Business Asset Development layer 41 in turn is recovered by the Business Model Development layer 40, all as shown in FIG. 3. Each of the above-mentioned operations form a category, i.e., a specific kind of operation with defined rules. These rules are independent of the environment, but the tools that can be used to implement those rules are environment dependent. The tool wrappers are designed to act as an interface between the environment-independent rules and the environment-dependent tools, thereby linking them together and making the tools transparent to the environment. This enables the tools to be environment independent and integrates them with other tools. In order to perform these operations, a tool wrapper, e.g. tool wrapper 44 is employed for the Create/Modify operation on the layer 40. A tool wrapper 45 is employed for the mapping operation down to the Business Asset Development layer 41. The tool wrapper abstracts the actual tool chosen into a standard interface, thereby hiding the specifics of the tool from its users.

Figure 4:
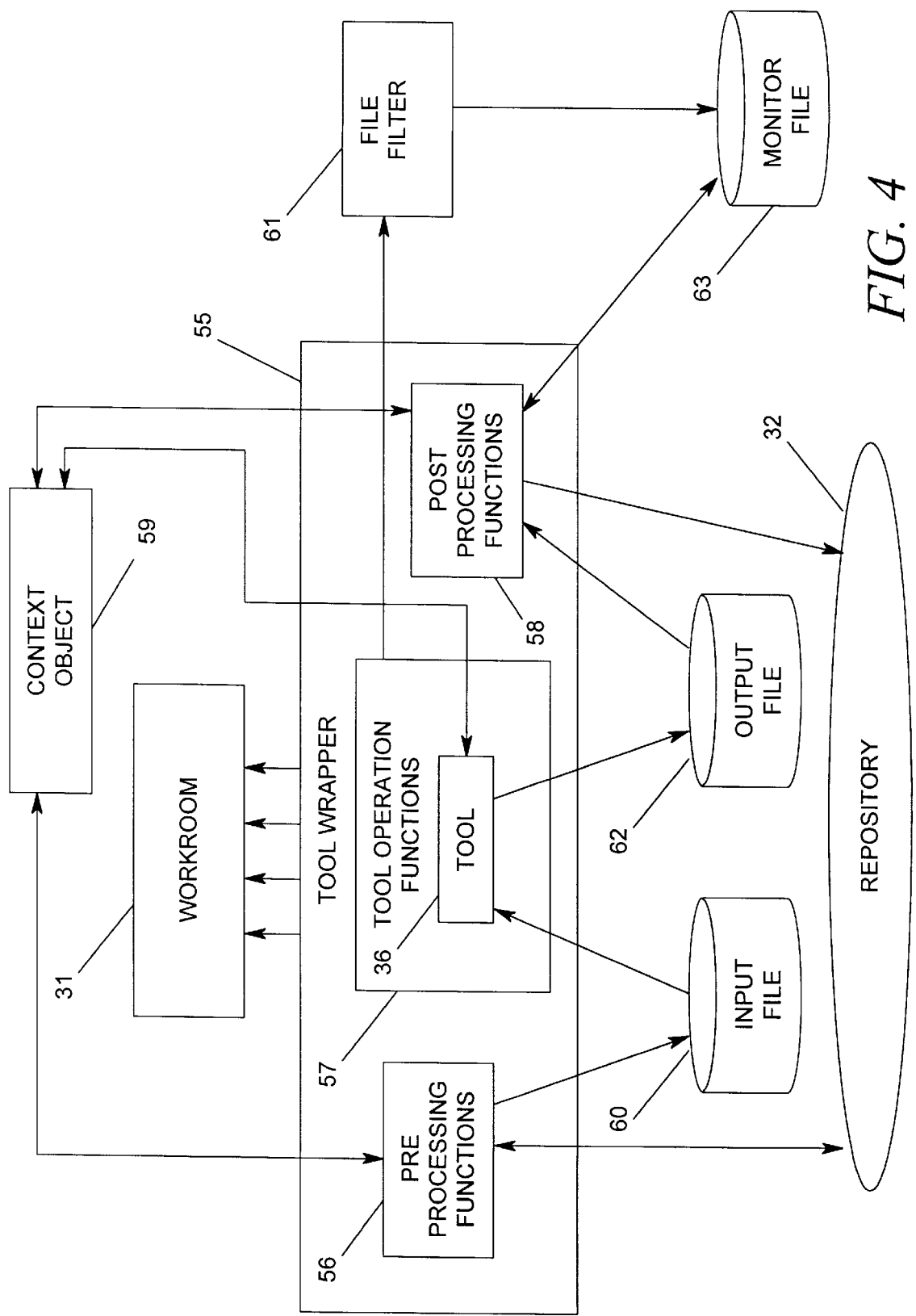
FIG. 4 is a block diagram of the method and system of the present invention.

Referring now to FIG. 4, a block diagram illustrates the function of a tool wrapper in accordance with the method and system of the present invention. The components of the tool wrapper are illustrated within a block 55, which includes the tool 36. It is pointed out that the wrapper for the tool 37 is arranged in a like manner. The functionalities of the tool wrapper 55 can be divided into three categories: a pre-processing functions module 56, a tool operation functions module 57 and a post processing functions module 58. These three modules work together to integrate third party tools (e.g, the tools 36, 37) into the framework. Each integrated tool has a wrapper 55 that incorporates the unique functionality required for the tool. The wrapper 55 is compatible with all tools used for similar purposes in the framework. The tool wrapper 55 illustrated in FIG. 4 and described herein is referred to as a generic tool wrapper, which can act as the building block for any particular tool wrapper category that the user wants to implement in the framework. Also, it is pointed out that the modules 56 and 58 need not be incorporated into the tool wrapper 55 and may exist as separate modules independent of the tool wrapper.

Whenever a tool is invoked inside a computer system framework having one or more tool wrappers and a repository (such as the repository 32), the preprocessing functions module 56 of that wrapper (such as the tool wrapper 55) is invoked. The pre-processing functions module 56 communicates with the repository 32 to identify the functionalities of the category for which the tool 36 is invoked. The module 56 then builds a software object class called a context object 59 that stores meta information about the tool 36 and its category retrieved from the repository 32. The module 56 also retrieves the files needed for the tool 36 to operate from the database in which the files are kept, such as the database 33, FIG. 2. These files serve as an input to an application, which is operated upon by the tool 36. The module 56 also records any meta information that might be derived while choosing the input files into the context object regarding the particular operation the tool is going to perform. The tool operation functions module 57 invokes the tool 36 and executes it on an input file 60 provided by the pre-processing functions module 56.

The module 57 can also invoke other associated software functions like a file filter 61, which monitors all the input/output operations performed by the tool 36. The file filter 61 is described in greater detail in the above-cited patent application Ser. No. 09/154,613, entitled A METHOD AND SYSTEM FOR MONITORING AND CAPTURING ALL FILE USAGE OF A SOFTWARE TOOL and assigned to the same assignee hereof.

While the tool 36 is being executed, there may be user interventions required for inputs, approval, etc. Such communications are initiated in the workroom 31, which includes but is not limited to the front end user screen. The workroom 31 receives feedback regarding the status of the operation from the tool operation functions module 55, which also stores the output derived as a result of the tool 36 operation in appropriate files stored in databases called an output file 62. The module 57 continuously monitors the tool 36 while it is running and records any meta information generated in the process into the context object 59. The tool 36 also accesses the context object 59 to identify the structure of the function to be performed as logged on before its inception.

The output file 62 serves as an input to the post processing functions module 58, which analyses the output produced as a result of running the tool 36 in conjunction with the monitor file 63. The monitor file 63 is the database that stores information derived as a result of running the file filter 61. The post processing functions module 58 also accesses the context object 59 to review the meta information generated in the process of running the tool 36. As a result of the analysis performed by the post processing functions module 58 some meta information is also generated pertaining to the specific execution carried out by the tool 36. This meta information is stored in the repository 32 by the post processing functions module 58.

The present method and system defines a number of tool wrapper categories, with each including an interface. The base class of tool wrappers implements four methods (GetCategory, GetVisibleName, Configure and Remove). The base class is an abstract class including some thirteen specializations. A special component (ToolWrapperCategories) is included to provide other components with the names and encodings of the tool categories. The public properties of this component include the encoding for each of the available tool categories and a collection of all the visible names of these categories. All tools currently fit into one of these tool categories.

During the course of using the method and system of the present invention it may become necessary to add, and possibly remove, various tools from the framework. A default tool may be chosen for any given category, and this tool, or any other available tool, may be selected to perform a particular function on a given occasion. In addition, the tools themselves and their tool wrappers may need configuration based on the user's preferences and requirements. The framework provides several components to manage this process.

Figure 5:
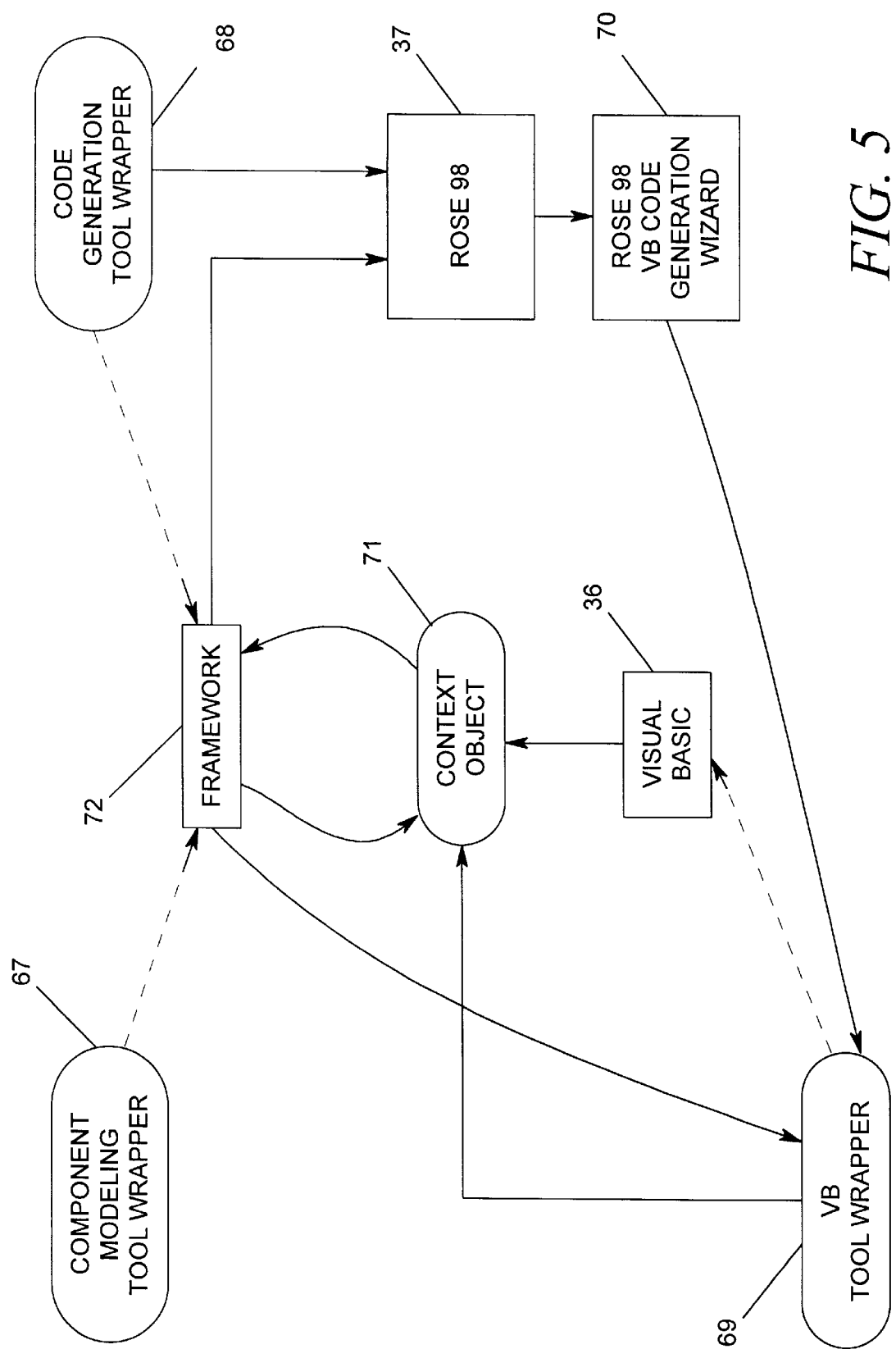
FIG. 5 is a block diagram of the method and system of a run-time application using the present invention.

Referring now to FIG. 5, a run-time application of the method and system of the present invention is illustrated. This illustrated example relates to the Rose98 tool 37/Visual Basic tool 36 code generation process, and the code therefor is set forth in Appendix A hereof. The tool wrappers used in this example are a component modeling tool wrapper 67, a code generation tool wrapper 68 and a Visual Basic tool wrapper 69. The tool wrappers help integrate the tools (i.e., the Rose98 tool 37 and the Visual Basic tool 36) into the computer system framework in order to generate a visual basic code through a Rose98/VB code generation wizard 70.

A context object 71, which is similar to the context object 59 in FIG. 4, stores and shares meta information in the illustrated run-time environment of the process for better integration of the tools within the framework 72. When a user initiates a Rose98/VB generation process, the component modeling tool wrapper 67 or the code generation tool wrapper 68 are invoked. The wrapper 67 is required for identifying and modeling the components involved in the process of code generation. The wrapper 68 is required for capturing and running the wizard 70.

The process begins either from the component modeling tool wrapper 67 or from the code generation tool wrapper 68. The tool wrapper (67 or 68) creates the context object 71 and writes context information therein. From the tool wrapper 67, context information would be the tool wrapper category. From the tool wrapper 68, context information would be the tool wrapper category and the component selected for code generation.

Following the above, the tool wrapper 68 checks in the framework 72 to determine whether or not a similar code has been generated previously. If so, the tool wrapper 68 facilitates obtaining a latest version of that code from the tool wrapper used for controlling sources and stores the path to that source in the context object 71. Whether or not a previously written code is recovered, the tool wrapper 68 initiates the tool wrapper 69, which starts the visual basic tool 36. The Visual Basic tool wrapper 69 then writes in the context object 71 the fact that the visual basic tool 36 has started.

After this, the tool wrappers 67 and 68 start the Rose98 tool 37 and each tool wrapper loads a component in the tool 37 for which code is to be generated. In the case of the tool wrapper 67, the component is one selected by the user for code generation, while in the case of the tool wrapper 68, the model contains the components of the model supplied by the tool wrapper 67. The link between the model and the components is facilitated by the framework 72. The tool wrapper 68 also loads the classes (including the components) into the Rose98 tool 37. The classes are extracted from the components and models by the tool wrapper 68. The generation process repeats itself for each component selected through the tool wrapper 67.

The tool wrapper 68 writes a Rose98 script into the tool 37 for calling the wizard 70. The information regarding the content of the script written in the preceding step is stored in the context object 71 so that the tool wrapper 67 is able to follow the process carried on by the tool wrapper 68. The wizard 70 is next called through the Rose98 script for generating Visual Basic code using the models, components and classes loaded into the Rose98 tool 37.

The wizard 70 communicates with the visual basic tool 36 for writing the code therein. The user now sees this automatically generated code in a Visual Basic screen although the models and components were selected in a Component Modeling screen.

When code generation is completed, the tool wrapper 69 writes into the context object 71 the fact that the process has been completed and the visual basic tool 68 will now exit.

The tool wrapper 67 and the tool wrapper 68 read the context object 71 to determine if the Rose98 tool 70 and the visual basic tool 36 have been closed. If so, the tool wrapper 67 prompts the user to perform any post processing functions necessary while the tool wrapper 68 performs the post processing functions itself. The context object 71 is then destroyed and the process is completed.

The methods and apparatus of the present invention, or certain aspects or portions thereof, may take the form of program code (i.e., instructions) embodied in tangible media, such as floppy diskettes, CD-ROMS, hard drives, or any other machine-readable storage medium, wherein, when the program code is loaded into and executed by a machine, such as a computer, the machine becomes an apparatus for practicing the invention. The methods and apparatus of the present invention may also be embodied in the form of program code that is transmitted over some transmission medium, such as over electrical wiring or cabling, through fiber optics, or via any other form of transmission, wherein, when the program code is received and loaded into and executed by a machine, such as a computer, the machine becomes an apparatus for practicing the invention. When implemented on a general-purpose processor, the program code combines with the processor to provide a unique apparatus that operates analogously to specific logic circuits.

Although the invention has been described with reference to a specific embodiment, this description is not meant to be construed in a limiting sense. Various modifications of the disclosed embodiment as well as alternative embodiments of the invention will become apparent to one skilled in the art upon reference to the description of the invention. It is therefore contemplated that the appended claims will cover any such modifications of embodiments that fall within the true scope of the invention.

What is claimed is:

1. In a software development and maintenance framework in a computer system executing a repository program, said system having a storage device, a method for facilitating use of a tool in heterogeneous environments and application categories, said method comprising the steps of:
   a.) creating a context object to store all information generated while said tool is being used;
   b.) identifying a specific environment in which said tool is going to be used and storing information about said environment in said context object;
   c.) identifying specific tasks said tool typically performs and searching for any previously accomplished tasks in said computer system;
   d.) storing in said context object results of the search in the preceding step;
   e.) selecting by a wrapper tool information needed for said tool to operate from said repository and supplying the selected information as input files to said tool;
   f.) running said tool with said input files and storing output derived as a result of running said tool;
   g.) updating said context object by analyzing output derived from said tool; and,
   h.) storing analyzed output of the operation performed by said tool on the repository for said environment.

2. The method as in claim 1 wherein said context object comprises a facility disposed for sharing resources between all participating objects in said framework.

3. The method as in claim 1 wherein said context object comprises a software module that facilitates sharing of resources among all participating software modules of said framework.

4. The method as in claim 1 further including pre-processing disposed for extracting from said storage device a software model, which is native to said storage device, for each tool and converting it to a file format which is meaningful to both said storage device and said tool and supplying it as an input to said tool.

5. The method as in claim 1 further including pre-processing disposed for extracting a UML model from said storage device, which is native to said storage device, for each tool and converting it to an XML file which is meaningful to both said storage device and said tool and supplying it as an input to said tool.

6. The method as in claim 1 further including post-processing disposed for extracting a file, which is native to said tool and said storage device, and converting it to a software model native to said storage device and storing it back in storage device.

7. The method as in claim 1 further including post-processing disposed for extracting an XML file, which is native to said tool and said storage device, and converting it to an UML software model native to said storage device and storing it back in said storage device.

8. A program storage media readable by a machine executing a repository program, said machine having a storage device, said storage media tangibly embodying a program of instructions executable by the machine in a software development framework, said program of instructions performing method steps for interfacing a variety of software development tools to said machine, said method steps comprising:
   a. creating a context object to store all information generated while said tool is being used;
   b. identifying a specific environment in which said tool is going to be used and storing information about said environment in said context object;
   c. identifying specific tasks said tool typically performs and searching for any previously accomplished tasks in said computer system;
   d. storing in said context object the results of the search in the preceding step;
   e. selecting by a wrapper tool information needed for said tool to operate from said repository and supplying the selected information as input files to said tool;
   f. running said tool with said input files and storing output derived as a result of running said tool;

g. updating said context object by analyzing output derived from said tool; and, h. storing analyzed output of the operation performed by said tool on the repository for said environment.

9. The storage media as in claim 8 wherein said context object comprises a communication method for sharing resources between all participating objects in said framework.

10. The storage media as in claim 8 wherein said context object comprises a software module that facilitates sharing of resources among all participating software modules of said framework.

11. The storage media as in claim 8 further including pre-processing disposed for extracting from said storage device a software model, which is native to said storage device, for each tool and converting it to a file format which is meaningful to both said storage device and said tool and supplying it as an input to said tool.

12. The storage media as in claim 8 further including pre-processing disposed for extracting a UML model from said storage device, which is native to said storage device, for each tool and converting it to an XML file which is meaningful to both said storage device and said tool and supplying it as an input to said tool.

13. The storage media as in claim 8 further including post-processing disposed for extracting a file, which is native to said tool and said storage device, and converting it to a software model native to said storage device and storing it back in storage device.

14. The storage media as in claim 8 further including post-processing disposed for extracting an XML file, which is native to said tool and said storage device, and converting it to an UML software model native to said storage device and storing it back in said storage device.

* * * * *